US009538395B2

(12) United States Patent
Sadek et al.

(10) Patent No.: US 9,538,395 B2
(45) Date of Patent: Jan. 3, 2017

(54) METHOD AND APPARATUS FOR MITIGATING THE IMPACT OF SHORT INTERFERENCE BURSTS

(71) Applicant: QUALCOMM Incorporated, San Diego, CA (US)

(72) Inventors: Ahmed Kamel Sadek, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 13/842,271

(22) Filed: Mar. 15, 2013

(65) Prior Publication Data
US 2014/0269367 A1    Sep. 18, 2014

(51) Int. Cl.
G01R 31/08    (2006.01)
H04W 4/00    (2009.01)
H04W 24/02    (2009.01)
H04L 1/00    (2006.01)
H04L 1/18    (2006.01)

(52) U.S. Cl.
CPC ............ H04W 24/02 (2013.01); H04L 1/0006 (2013.01); H04L 1/0021 (2013.01); H04L 1/1887 (2013.01)

(58) Field of Classification Search
CPC ............ H04W 24/02; H04W 74/0816; H04W 52/243; H04W 52/26; H04W 52/245; H04W 52/241; H04W 52/24; H04W 52/00; H04L 12/26; H04L 28/06; H04L 28/04; H04L 26/28; H04L 36/30; H04L 43/0811; H04L 1/16; H04L 1/0013; H04L 1/0002; H04L 47/10
USPC ... 375/346, 349, 350, 351, 240.02; 370/251, 370/252, 321, 338, 337, 330, 331, 332, 329, 370/448, 450, 459, 461, 462, 477, 232, 235, 370/473; 455/132–135, 69, 63, 67.4
See application file for complete search history.

(56) References Cited

U.S. PATENT DOCUMENTS 6,542,718 B1 * 4/2003 Kuo et al. ........................ 455/69
7,519,030 B2 * 4/2009 Cimini, Jr. .............. H04L 47/10
                                                           370/338
7,668,102 B2 * 2/2010 Li ............................. H04L 1/16
                                                           370/230
8,194,626 B2 * 6/2012 Moorti et al. ................. 370/338
8,265,564 B2 * 9/2012 Lee ........................ H04L 1/0007
                                                           370/242

(Continued)

OTHER PUBLICATIONS

International Search Report and Written Opinion—PCT/US2014/020442—ISA/EPO—Jun. 23, 2014.
Taiwan Search Report—TW103107241—TIPO—Jun. 23, 2015.

Primary Examiner — Hanh N Nguyen
(74) Attorney, Agent, or Firm — Arent Fox LLP

(57) ABSTRACT

Techniques are provided for utilizing selected inter-frame spacing, such as reduced inter-frame spacing (RIFS) or short inter-frame spacing (SIFS) to avoid failed data transmissions in a Wi-Fi network or the like. For example, there is provided a method, operable by a transmitter node or entity, such as, for example, an access point (AP), that may involve sending a data transmission in a data aggregation mode, the data transmission comprising aggregated MAC protocol data units (A-MPDUs). The method may involve monitoring for and detecting potential short interference bursts in the network. The method may involve re-sending the data transmission in a data bursting mode, the data transmission comprising back-to-back data packet bursts separated by a selected inter-frame spacing.

31 Claims, 8 Drawing Sheets

(56) References Cited

U.S. PATENT DOCUMENTS

| | | | |
|---|---|---|---|
| 8,270,437 B2* | 9/2012 | Akhmetov | 370/473 |
| 8,295,189 B2* | 10/2012 | Hassan | H04L 1/0002 340/468 |
| 8,300,563 B2* | 10/2012 | Krishnaswamy et al. | 370/310 |
| 8,531,998 B2* | 9/2013 | Horvat et al. | 370/280 |
| 8,824,288 B2* | 9/2014 | Gao | H04L 43/0811 370/231 |
| 2006/0034248 A1 | 2/2006 | Mishra et al. | |
| 2008/0144500 A1* | 6/2008 | Chen | H04W 74/0816 370/235 |
| 2009/0031185 A1* | 1/2009 | Xhafa | H04L 1/0013 714/751 |
| 2010/0309803 A1 | 12/2010 | Toh et al. | |
| 2011/0267966 A1* | 11/2011 | Gao | H04W 28/22 370/252 |
| 2012/0307886 A1* | 12/2012 | Agarwal et al. | 375/240.02 |

* cited by examiner

METHOD AND APPARATUS FOR MITIGATING THE IMPACT OF SHORT INTERFERENCE BURSTS

BACKGROUND

Field

The present disclosure relates generally to communication systems, and more specifically to mitigating the impact of short interference bursts.

Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks, Carrier Sense Multiple Access (CSMA).

A wireless communication network may include a number of access point that can support communication for a number of mobile devices, such as, for example, mobile stations (STA), laptops, cell phones, PDAs, tablets, etc. A STA may communicate with an access point via the downlink (DL) and uplink (UL). The DL (or forward link) refers to the communication link from the access point to the STA, and the UL (or reverse link) refers to the communication link from the STA to the access point. With the increasing popularity of mobile devices, there is a desire to optimize bandwidth and resource selection.

With increased consumer demand for mobile broadband and Internet access, wireless networks, including Wi-Fi networks, often perform aggregation of component carriers to increase the available bandwidth. However, Wi-Fi networks, as well as similar wireless local area networks (WLANs), may be subject to short interference bursts. In this context, there remains a need to mitigate the effect of such interference.

SUMMARY

Illustrative embodiments of the present invention that are shown in the drawings are summarized below. These and other embodiments are more fully described in the detailed description section. It is to be understood, however, that the invention is not limited to the forms described in this Summary of the Invention or in the detailed description.

In accordance with one or more aspects of the embodiments described herein, there is provided a method for mitigating the impact of short interference bursts in Wi-Fi networks or the like. The method may be operable by a transmitter node in wireless communication system. The method may involve sending a data transmission in a data aggregation mode, the data transmission comprising aggregated MAC protocol data units (A-MPDUs). The method may involve monitoring for and detecting potential short interference bursts in the network. The method may involve, in response to detecting such interference, re-sending the data transmission in a data bursting mode, the data transmission comprising back-to-back data packet bursts separated by a selected inter-frame spacing, such as, for example, reduced inter-frame spacing (RIFS) or the like. In related aspects, an electronic device (e.g., an AP or component(s) thereof) may be configured to execute the above described methodology.

In accordance with one or more aspects of the embodiments described herein, there is provided a method operable by a receiver node in wireless communication system. The method may involve receiving a data transmission in a data aggregation mode, the data transmission comprising A-MPDUs. The method may involve in response to potential short interference bursts in the network, re-receiving the data transmission in a data bursting mode, the data transmission comprising back-to-back data packet bursts separated by a selected inter-frame spacing, such as, for example, RIFS or the like. In related aspects, an electronic device (e.g., an STA or component(s) thereof) may be configured to execute the above described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIGS. 3A-C illustrate an example methodology operable by a transmitter node in a Wi-Fi network or the like.

FIGS. 4A-B illustrate an example methodology operable by a receiver node in a Wi-Fi network or the like.

DETAILED DESCRIPTION

Figure 1:
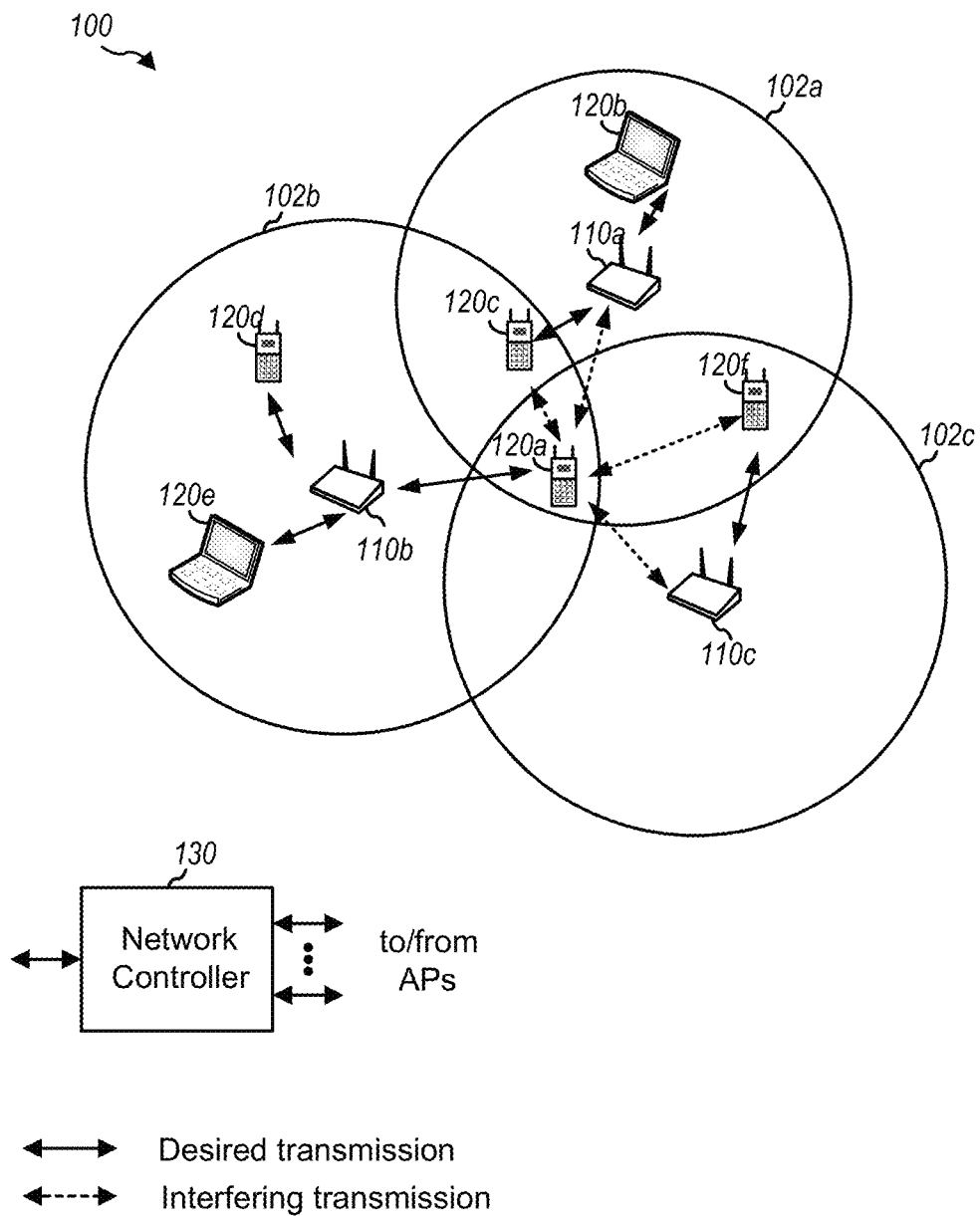
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station (STA), mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with an access point (AP). An access point may be utilized for communicating with wireless terminal(s) and may also be referred to as a base station, wireless access point, Wi-Fi access point, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, Wi-Fi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. Wi-Fi is a set of standards for implementing wireless local area network (WLAN) computer communication. Wi-Fi may include the industrial, scientific, and medical (ISM) radio bands including the 2.4, 3.6, 5, and 60 GHz frequency bands. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100, which may be a Wi-Fi network, is illustrated in accordance with various embodiments presented herein. The wireless network 100 may include a number of APs 110 and other network entities. An AP 100 may be a station that communicates with a STA 120 and may also be referred to as a base station, Wi-Fi AP, or other term. Each AP 110a, 110b, 110c may provide communication coverage for a particular geographic area, which may be called a basic service area (BSA). A basic service set (BSS) may refer to an AP together with all associated STAs in an infrastructure mode. In ad-hoc mode, it may be possible to create a network of client devices without a controlling AP. In the ad-hoc mode, a set of synchronized STAs (with one acting as a master) may form the BSS. Overlapping BSSs (OBSS) may occur when the two or more of the BSSs are in close enough proximity to hear each other. In the example of FIG. 1, BSSs associated with APs 110a, 110b, and 110c overlap. OBSS may degrade network performance. Each BSS may be identified by a BSS id (BSSID) or the like. For example, the BSSID may include or be based on the medium access control (MAC) address of the AP.

An AP may provide communication coverage for a cell. In the example shown in FIG. 1, the APs 110a, 110b, and 110c may be Wi-Fi APs for the cells 102a, 102b, and 102c, respectively. Each AP may operate on one or more channels. The one or channels for each AP may be chosen or selected to minimize interference between cells.

A network controller 130 may couple to a set of APs and provide coordination and control for these APs. The network controller 130 may communicate with the eNBs 110 via a backhaul. The APs 110 may also communicate with one another, e.g., directly or indirectly via wireless or wireline backhaul.

The STAs 120 may be dispersed throughout the wireless network 100, and each STA may be stationary or mobile. A STA may also be referred to as a terminal, a mobile station, a subscriber unit, a station, etc. A STA may be a cellular phone, a personal digital assistant (PDA), a wireless modem, a wireless communication device, a handheld device, a laptop computer, a cordless phone, a wireless local loop (WLL) station, or other mobile entities. A STA may be able to communicate with eNBs, APs, or other network entities. In FIG. 1, a solid line with double arrows indicates desired transmissions between a STA and a serving AP, which is an AP designated to serve the STA on the downlink and/or uplink. A dashed line with double arrows indicates interfering transmissions between from STAs or APs. AP 110a may be in communication with STAs 120b, 120c. AP 110b may be in communication with STAs 120a, 120d, 120e. AP 110c may be in communication with STA 120f, 120e. STAs and APs may receive interference from other APs and STAs. In the example of FIG. 1, STA 120a experiences interference from STAs 120c, 120f, and APs 110a, 110c. The APs may receive interference from other APs and STAs (not illustrated).

Channel selection in Wi-Fi may be based on AP measurements whether the traffic is DL (from AP to STA) or UL (from STA to AP). Moreover, smart channel may be based on the AP measuring beacons from other APs and deciding on the channel with least interference. With DL traffic, the AP may be the transmitter and the STA may be the receiver. Therefore, there may be a mismatch between the interference seen at the AP and the interference seen at the STA. An example may be when the AP and STA are far from each other. Furthermore, the dominant source of interference to the STA may be another STA rather than an AP.

In accordance with the focus of the present disclosure, performance of a Wi-Fi network (e.g., the network 100 in FIG. 1) is vulnerable to short interference bursts. This may be due to receiver implementation issues such as automatic gain control (AGC) and phase tracking, or because interleaving is done over one OFDM symbol which is 4 μs. If a long transmission opportunity packet (TXOP) is sent, even a short acknowledgment (ACK) burst that is 30-40 μs can result in most of the MPDUs in the TXOP being lost. Described herein is a technique for reducing the impact of such short interference bursts.

Packet Bursts with Selected Inter-Frame Spacing: Reduced inter-frame spacing (RIFS) for bursts has been proposed in 802.11n to improve MAC efficiency. This approach was dropped from 802.11ac since it was believed that aggregation can provide better efficiency. Packet bursts may be sent back-to-back with RIFS separation of about a 2 us separation between the packet bursts. Such an approach may be more efficient than short inter-frame spacing (SIFS) separated bursts or baseline operation where each packet is ACKed separately. It is noted that using RIFS bursts introduces overhead compared to aggregation; however, using RIFS increases robustness since each burst is individually encoded and decoded.

Short interference bursts will only cause erasures to some of these bursts rather than the whole aggregated packet, reducing the overall impact of the interference. The size of each burst may be adapted based on the interference level and the duty cycle. Such adaptions to the size of each burst may be based at least in part on a recommendation from STA(s) and/or interference statistics reported by a structural testing system (STS) or the like.

As the number of short interference bursts increases, or if the dominant interference is not a short burst (e.g., a data transmission rather than an ACK) the value or benefit of the RIFS burst may be reduced. As such, a packet error rate (PER) calculation at the AP may not be sufficient to trigger the RIFS bursts.

Burst Parameter Calculation: Switching from data transmission via a data aggregation mode to data transmission via a data bursting mode (e.g., with RIFS or SIFS between the back-to-back data packets bursts) may be event triggered at the STA or the AP. The triggering events may include collisions rates interference measurements, or the like.

Closed Loop: A receiving node (e.g., the STA or the like) may directly request transmitting via a RIFS burst mode and may determine the RIFS parameters in a message to a transmitter node (e.g., the AP or the like). The receiving node may provide feedback to the transmitter node regarding interference levels, burst length, duty cycles, or the like. The transmitting node may in turn select or make decisions regarding the triggering RIFS bursts parameters. While the example of a RIFS type inter-frame spacing is described herein, it is noted that other suitable selected inter-frame spacing (e.g., SIFS or the like) may be utilized with the techniques described herein.

Open Loop: When the transmitter node (e.g., the AP or the like) detects a PER that exceeds a PER threshold or triggering PER value, the transmitter node may switch to a RIFS burst mode and may further adapt parameters using a control loop to minimize the detected PER. For example, the short bursts may be reduced as a function of the detected PER. If the detected PER does not improve at a smaller or smallest RIFS burst, this may be an indication that the RIFS burst mode for data transmission is not suitable for mitigating interference.

Packet aggregation at aggressor STA: If the MAC ID or the BSSID of the STA causing the interference (i.e., the aggressor STA) is known (e.g., detected from the transmitted packets), the victim serving AP can request or instruct the aggressor serving AP to transmit in longer TXOPs and/or to use Block ACKs to reduce the number of ACKs transmitted by the aggressor STAs.

Figure 2A:
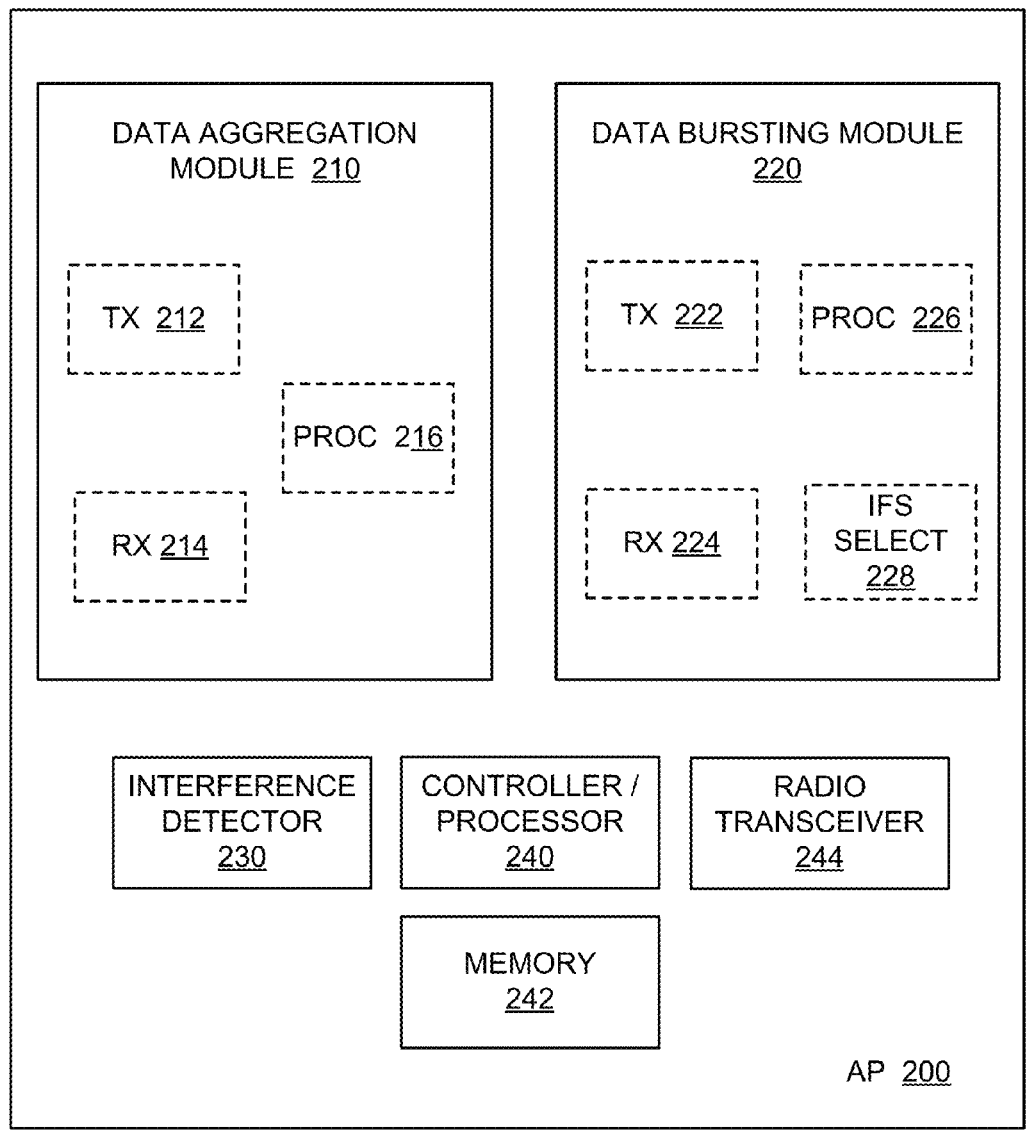
FIG. 2A shows an embodiment of an AP configured to mitigate the impact of short interference bursts.

In accordance with aspects of the present disclosure, there are provided dual-data transmission mode STA (e.g., the STA 120) and an AP (the AP 110) configured to mitigate the impact of short interference bursts in Wi-Fi. With reference to the embodiment of FIG. 2A, there is shown an AP 200 that includes a data aggregation module 210 and a data bursting module 220. The AP 200 may include an interference detection module 230 for detecting potential short interference bursts in the network. The AP 200 may further include a controller or processor module 240, a memory module 242, and a radio transceiver module 244 in operative communication with each other and the modules 210-230 via a serial bus or similar communication coupling. For example, the controller/processor 240 may effect initiation and scheduling of the processes or functions performed by the other shown modules or components thereof.

In related aspects, the data aggregation module 210 may optionally include a transmitter (TX) component 212, a receiver (RX) component 214, and a processor component 216, wherein each of the components are in operative communication with each other. In further related aspects, the data bursting module 220 may optionally include a TX component 222, a RX component 224, a processor component 226, and an inter-frame spacing selector (IFS SELECT) component 228, wherein each of the components are in operative communication with each other.

The data aggregation module 210, in conjunction with one or more of the modules 240-244, may send a data transmission in a data aggregation mode, the data transmission comprising aggregated MAC protocol data units (A-MPDUs).

The detection module 230, in conjunction with one or more of the modules 240-244, may monitor for and detect potential short interference bursts in the network (e.g., a Wi-Fi network or the like). For example, the detection module 230 may monitor for and detect whether a PER for the data transmission exceeds a PER threshold or the like. In another example, the detection module 230 may monitor for and detect whether (a) a PER for the data transmission exceeds a PER threshold and (b) whether an RSSI is below or above an RSSI threshold. In yet another example, the detection module 230 may monitor for and detect a failed delivery of the data transmission via the data aggregation mode to a receiver node (e.g., not receiving an ACK or the like from the receiving node). In still another example, the detection module 230 may monitor for and detect whether a collision rate exceeds a collision rate threshold or the like. In another example, the detection module 230 may monitor for and measure/detect an interference level that exceeds an interference threshold or the like.

The data bursting module 220, in conjunction with one or more of the modules 240-244, may re-send the data transmission in a data bursting mode, the data transmission comprising back-to-back data packet bursts separated by a selected inter-frame spacing (e.g., RIFS, SIFS, or the like). For example, the data bursting module 220 may adapt a control loop to reduce a detected PER, which may involve: (a) adapting the inter-frame spacing; (b) re-sending the data transmission in the data bursting mode with the adapted inter-frame spacing between the back-to-back data packet bursts; and (c) determining whether re-sending the data transmission with the adapted inter-frame spacing reduces the detected PER. In another example, the data bursting module 220 may adapt a control loop to reduce a detected PER by: (a) adapting data packet burst size; (b) re-sending the data transmission in the data bursting mode with the adapted data burst size; and (c) determining whether re-sending the data transmission with the adapted data packet burst size reduces the detected PER. In yet another example, the data bursting module 220 may adapt a control loop to reduce a detected PER by refraining from adapting at least one of a PHY rate or a MCS used in sending the data packet bursts due to packet errors associated with the short interference bursts. In further related aspects, the modules of the AP 200 may be configured to perform the processes shown in FIGS. 3A-C or variations thereof.

Figure 2B:
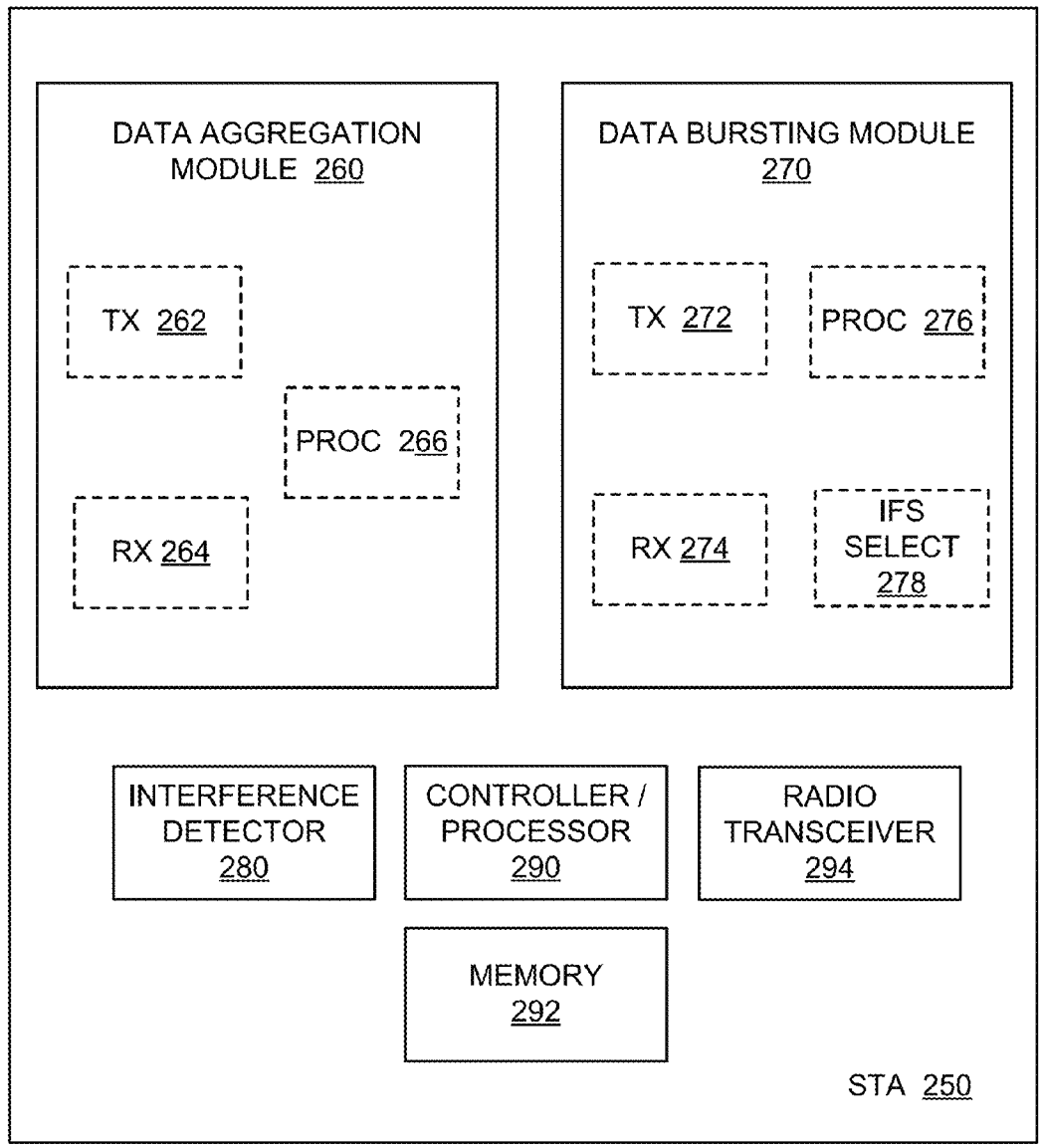
FIG. 2B shows an embodiment of a STA configured to mitigate the impact of short interference bursts.

With reference to the embodiment of FIG. 2B, there is shown an STA 250 that includes a data aggregation module 260 and a data bursting module 270. The STA 250 may include an interference detection module 280 for detecting potential short interference bursts in the network. The STA 250 may further include a controller or processor module 290, a memory module 292, a radio transceiver module 294 in operative communication with each other and the modules 250-280 via a serial bus or similar communication coupling. For example, the controller/processor 290 may effect initiation and scheduling of the processes or functions performed by the other shown modules or components thereof.

In related aspects, the data aggregation module 260 may optionally include a TX component 262, a RX component 264, and a processor component 266, wherein each of the components are in operative communication with each other. In further related aspects, the data bursting module 270 may optionally include a TX component 272, a RX component 274, a processor component 276, and an IFS SELECT component 278, wherein each of the components are in operative communication with each other.

The data aggregation module 260, in conjunction with one or more of the modules 290-294, may receive a data transmission in a data aggregation mode, the data transmission comprising A-MPDUs.

The interference detection module 280, in conjunction with one or more of the modules 290-294, may facilitate the monitoring or detection of short interference bursts in the network.

The data bursting module 270, in conjunction with one or more of the modules 290-294, may, in response to the potential short interference bursts in the network, re-receive the data transmission in a data bursting mode, the data transmission comprising back-to-back data packet bursts separated by a selected inter-frame spacing. For example, the bursting module 270, the controller 290, and/or the RF transceiver 294 may send, to a transmitter node, a request for the transmitter node to send the data transmission in the data bursting mode. In another example, the bursting module 270 may send, to the transmitter node, parameters of the selected inter-frame spacing. In yet another example, the bursting module 270 may send, to the transmitter node, feedback information regarding at least one of PER, interference levels, burst length, or duty cycles. In further related aspects, the modules of the STA 250 may be configured to perform the processes shown in FIGS. 4A-B or variations thereof.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3A:
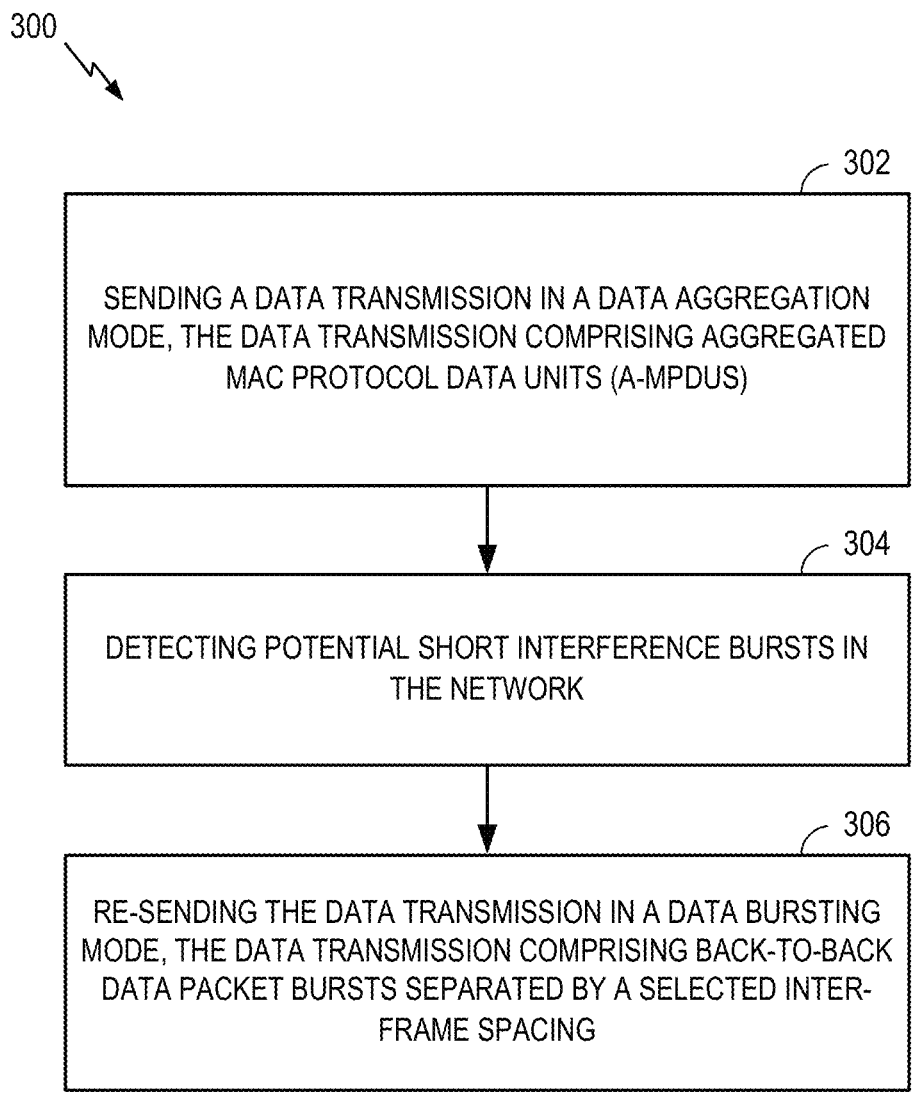

In accordance with one or more aspects of the embodiments described herein, with reference to FIG. 3A, there is shown a methodology 300, operable by a transmitter node/entity, such as, for example, a Wi-Fi AP, base station, or the like. In the alternative, the transmitter node may be a STA or the like. For example, the method 300 may involve, at 302, sending a data transmission in a data aggregation mode, the data transmission comprising A-MPDUs. The method 300 may involve, at 304, detecting potential short interference bursts in the network. Further, the method may involve, at 306, re-sending the data transmission in a data bursting mode, the data transmission comprising back-to-back data packet bursts separated by a selected inter-frame spacing.

Figure 3B:
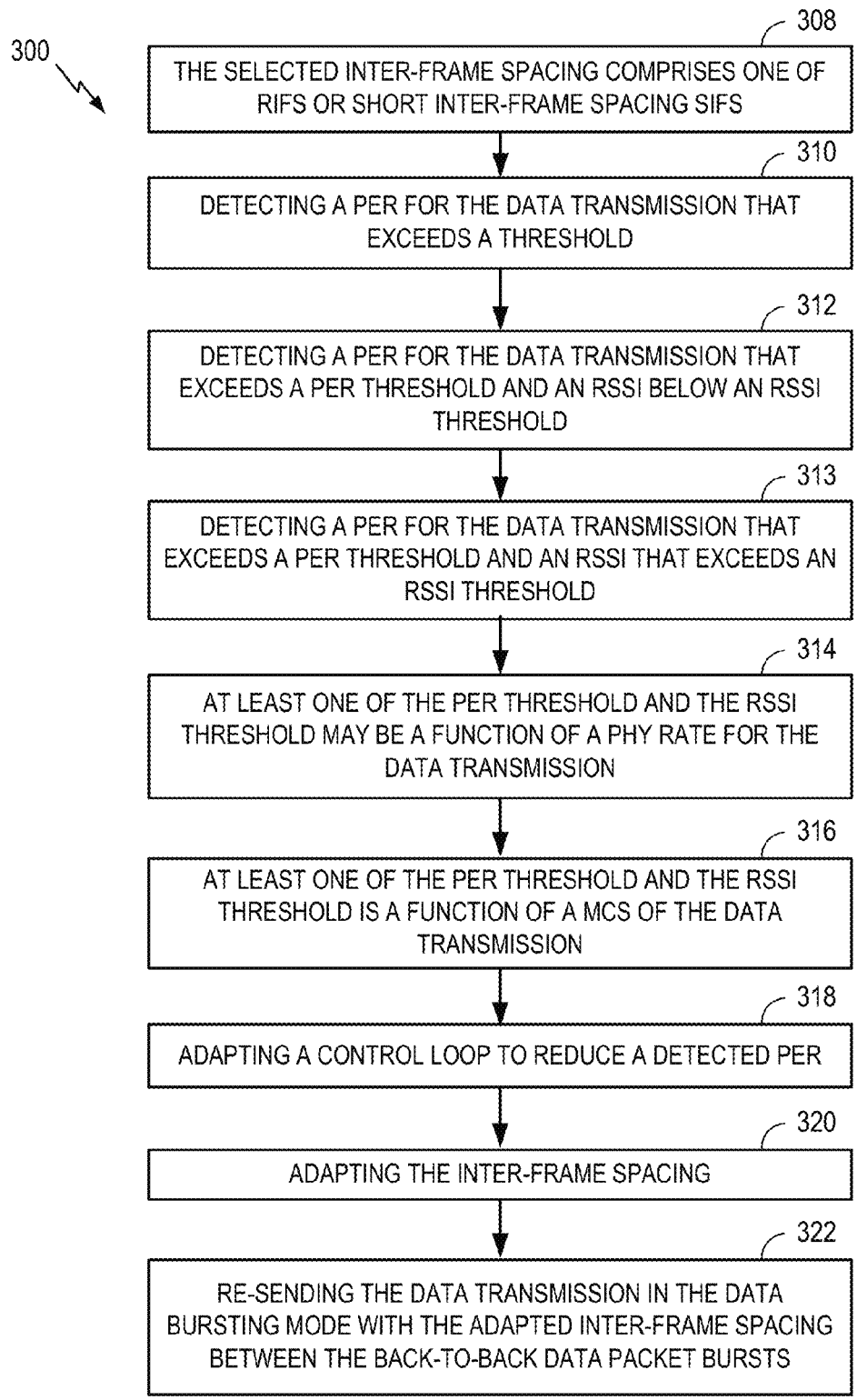
Figure 3C:
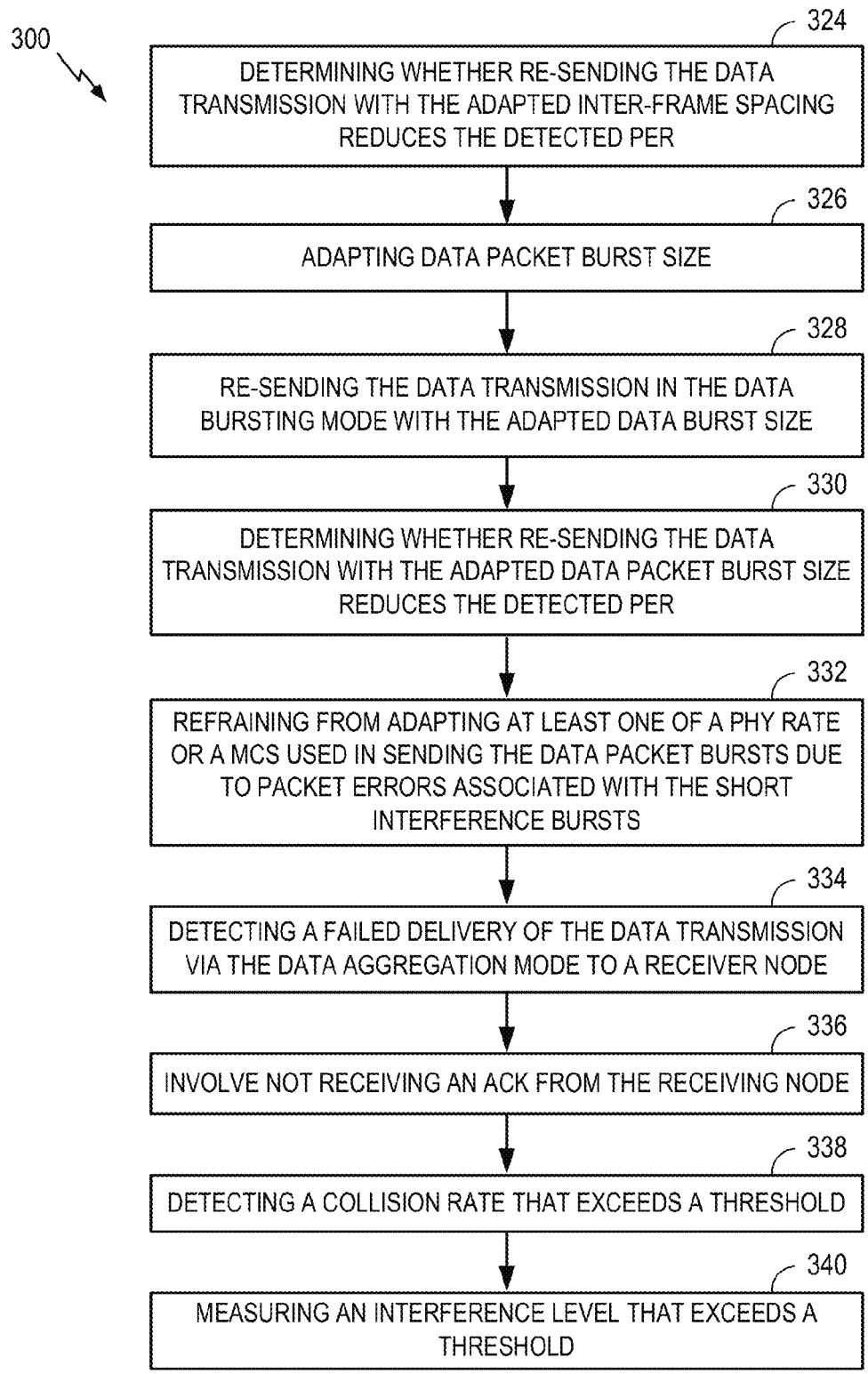

With reference to FIGS. 3B-C, there are shown further operations or aspects of method 300 that are optional are not required to perform the method 300. If the method 300 includes at least one block of FIGS. 3B-C, then the method 300 may terminate after the at least one block, without necessarily having to include any subsequent downstream block(s) that may be illustrated. For example, the selected inter-frame spacing comprises one of RIFS or short inter-frame spacing SIFS (block 308), as shown in FIG. 3B. Detecting (block 304) may involve detecting a packet error rate (PER) for the data transmission that exceeds a threshold (block 310).

In another example, detecting (block 304) may involve detecting a PER for the data transmission that exceeds a PER threshold and a received signal strength indicator (RSSI) below an RSSI threshold (block 312). In yet another example, detecting (block 304) may involve detecting a PER for the data transmission that exceeds a PER threshold and an RSSI that exceeds an RSSI threshold (block 313), which indicates that the link is generally good but may be exposed to or compromised by interference. At least one of the PER threshold and the RSSI threshold may be a function of a physical layer (PHY) rate for the data transmission (block 314). At least one of the PER threshold and the RSSI threshold is a function of a modulation and coding scheme (MCS) of the data transmission (block 316).

The method 300 may further involve adapting a control loop to reduce a detected PER (block 318). Adapting (block 318) may involve: adapting the inter-frame spacing (block 320); and re-sending the data transmission in the data bursting mode with the adapted inter-frame spacing between the back-to-back data packet bursts (block 322). With reference to FIG. 3C, the method 300 may further involve determining whether re-sending the data transmission with the adapted inter-frame spacing reduces the detected PER (block 324).

Adapting (block 318) may involve: adapting data packet burst size (block 326); and re-sending the data transmission in the data bursting mode with the adapted data burst size (block 328). The method 300 may further involve determining whether re-sending the data transmission with the adapted data packet burst size reduces the detected PER (block 330).

Adapting (block 318) may involve refraining from adapting at least one of a physical layer (PHY) rate or a modulation and coding scheme (MCS) used in sending the data packet bursts due to packet errors associated with the short interference bursts (block 332).

Detecting (block 304) may involve detecting a failed delivery of the data transmission via the data aggregation mode to a receiver node (block 334). Detecting (block 334) may involve not receiving an acknowledgment (ACK) from the receiving node (block 336).

In another example, detecting (block 304) may involve: detecting a collision rate that exceeds a threshold (block 338); and/or measuring an interference level that exceeds a threshold (block 340).

Figure 4A:
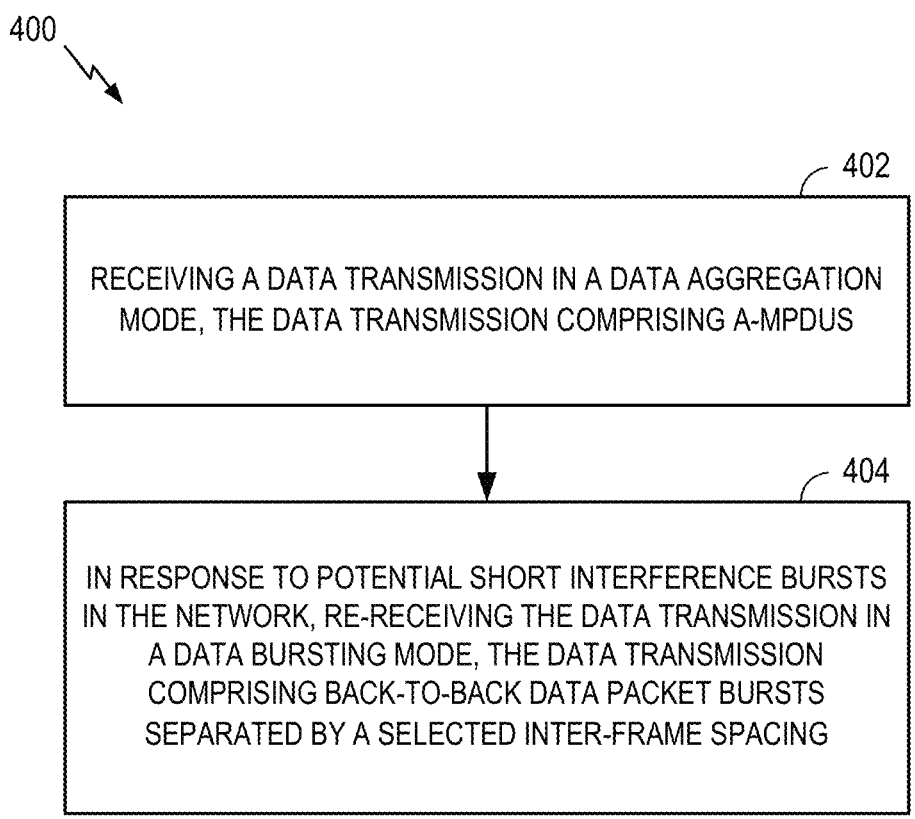

In accordance with one or more aspects of the embodiments described herein, with reference to FIG. 4A, there is shown a methodology 400, operable by a receiver node/entity, such as, for example, a STA or the like. In the alternative, the receiver node may be a Wi-Fi AP, base station, or the like. For example, the method 400 may involve, at 402, receiving a data transmission in a data aggregation mode, the data transmission comprising A-MPDUs. The method 400 may involve, at 404, in response to potential short interference bursts in the network, re-receiving the data transmission in a data bursting mode, the data transmission comprising back-to-back data packet bursts separated by a selected inter-frame spacing.

Figure 4B:
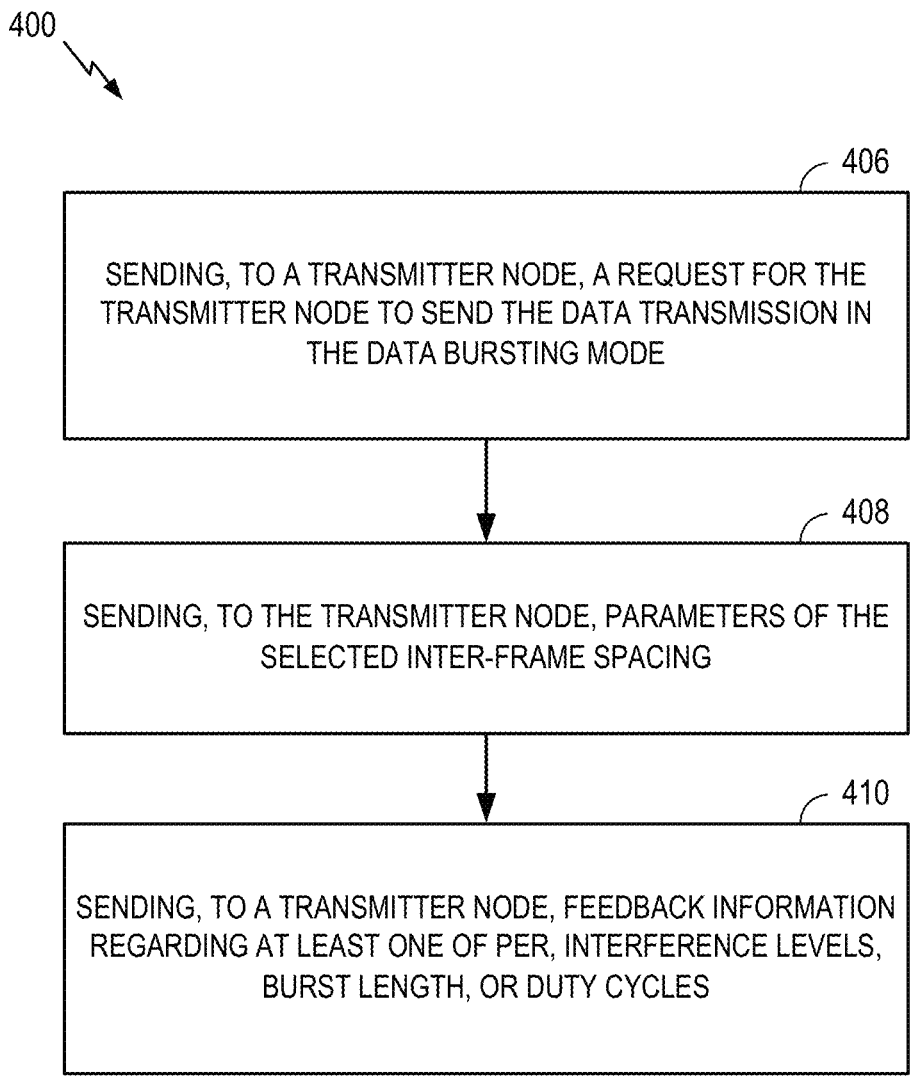

With reference to FIG. 4B, there are shown further operations or aspects of method 400 that are optional are not required to perform the method 400. If the method 400 includes at least one block of FIG. 4B, then the method 400 may terminate after the at least one block, without necessarily having to include any subsequent downstream block(s) that may be illustrated. For example, the method 400 may involve sending, to a transmitter node, a request for the transmitter node to send the data transmission in the data bursting mode (block 406). The method 400 may involve sending, to the transmitter node, parameters of the selected inter-frame spacing (block 408). In another example, the method 400 may involve sending, to a transmitter node, feedback information regarding at least one of packet error rate (PER), interference levels, burst length, or duty cycles (block 410).

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a transmitter node in a wireless communication network, the method comprising:
   sending, over a network, a data transmission in a data aggregation mode, the data transmission comprising aggregated MAC protocol data units (A-MPDUs);
   detecting potential interference bursts in the network, wherein detecting the potential interference bursts comprises detecting a packet error rate (PER) for the data transmission that exceeds a PER threshold and a received signal strength indicator (RSSI) below an RSSI threshold;
   switching, at the transmitter node, from the data aggregation mode to a data bursting mode in response to detecting the potential interference bursts; and
   re-sending the data transmission in the data bursting mode, the data transmission comprising back-to-back data packet bursts separated by a selected inter-frame spacing.

2. The method of claim 1, wherein the selected inter-frame spacing comprises one of reduced inter-frame spacing (RIFS) or short inter-frame spacing (SIFS).

3. The method of claim 1, wherein at least one of the PER threshold or the RSSI threshold is a function of a physical layer (PHY) rate for the data transmission.

4. The method of claim 1, wherein at least one of the PER threshold or the RSSI threshold is a function of a modulation and coding scheme (MCS) of the data transmission.

5. The method of claim 1, wherein detecting the potential interference bursts comprises detecting the PER for the data transmission that exceeds the PER threshold and the received signal strength indicator (RSSI) that exceeds the RSSI threshold.

6. The method of claim 1, further comprising adapting a control loop to reduce a detected PER.

7. The method of claim 6, wherein adapting the control loop comprises:
   adapting the inter-frame spacing; and
   re-sending the data transmission in the data bursting mode with the adapted inter-frame spacing between the back-to-back data packet bursts.

8. The method of claim 7, further comprising determining whether re-sending the data transmission with the adapted inter-frame spacing reduces the detected PER.

9. The method of claim 6, wherein adapting the control loop comprises:
   adapting data packet burst size; and
   re-sending the data transmission in the data bursting mode with the adapted data burst size.

10. The method of claim 9, further comprising determining whether re-sending the data transmission with the adapted data packet burst size reduces the detected PER.

11. The method of claim 6, wherein adapting the control loop comprises refraining from adapting at least one of a physical layer (PHY) rate or a modulation and coding scheme (MCS) used in sending the data packet bursts due to packet errors associated with the interference bursts.

12. The method of claim 1, wherein detecting the potential interference bursts comprises detecting a failed delivery of the data transmission via the data aggregation mode to a receiver node.

13. The method of claim 12, wherein detecting the failed delivery comprises not receiving an acknowledgment (ACK) from the receiving node.

14. The method of claim 1, wherein detecting the potential interference bursts comprises detecting a collision rate that exceeds a threshold.

15. The method of claim 1, wherein detecting the potential interference bursts comprises measuring an interference level that exceeds a threshold.

16. The method of claim 1, wherein the network comprises a Wi-Fi network.

17. The method of claim 1, wherein the transmitter node comprises one of a mobile station (STA) and an access point (AP) within the network.

18. An apparatus, comprising:
   means for sending, over a network, a data transmission in a data aggregation mode, the data transmission comprising aggregated MAC protocol data units (A-MPDUs);
   means for detecting potential interference bursts in the network, wherein the means for detecting the potential interference bursts comprises means for detecting a packet error rate (PER) for the data transmission that exceeds a PER threshold and a received signal strength indicator (RSSI) below an RSSI threshold;
   means for switching, at the transmitter node, from the data aggregation mode to a data bursting mode in response to detecting the potential interference bursts; and
   means for re-sending the data transmission in the data bursting mode, the data transmission comprising back-to-back data packet bursts separated by a selected inter-frame spacing.

19. The apparatus of claim 18, wherein the selected inter-frame spacing comprises one of reduced inter-frame spacing (RIFS) or short inter-frame spacing (SIFS).

20. An apparatus, comprising:
   a radio transceiver configured to send, over a network, a data transmission in a data aggregation mode, the data transmission comprising aggregated MAC protocol data units (A-MPDUs); and
   at least one processor configured to:
   detect potential interference bursts in the network, wherein to detect the potential interference bursts comprises detecting a packet error rate (PER) for the data transmission that exceeds a PER threshold and a received signal strength indicator (RSSI) below an RSSI threshold;
   switch, at the transmitter node, from the data aggregation mode to a data bursting mode in response to detecting the potential interference bursts; and
   instruct the radio transceiver to re-send the data transmission in the data bursting mode, the data transmission comprising back-to-back data packet bursts separated by a selected inter-frame spacing.

21. A non-transitory computer-readable medium comprising code for causing a computer to:
send, over a network, a data transmission in a data aggregation mode, the data transmission comprising aggregated MAC protocol data units (A-MPDUs);
detect potential interference bursts in the network, wherein to detect the potential interference bursts comprises detecting a packet error rate (PER) for the data transmission that exceeds a PER threshold and a received signal strength indicator (RSSI) below an RSSI threshold;
switch, at the transmitter node, from the data aggregation mode to a data bursting mode in response to detecting the potential interference bursts; and
re-send the data transmission in the data bursting mode, the data transmission comprising back-to-back data packet bursts separated by a selected inter-frame spacing.

22. A method operable by a receiver node in a wireless communication network, the method comprising:
receiving, over a network, a data transmission in a data aggregation mode, the data transmission comprising aggregated MAC protocol data units (A-MPDUs);
detecting potential interference bursts in the network;
sending, to a transmitter node, parameters of a selected inter-frame spacing in response to the potential interference bursts in the network, wherein the transmitter node switches from the data aggregation mode to a data bursting mode; and
re-receiving the data transmission in the data bursting mode, the data transmission comprising back-to-back data packet bursts separated by the selected inter-frame spacing based at least in part on the parameters previously sent to the transmitter node.

23. The method of claim 22, further comprising sending, to a transmitter node, a request for the transmitter node to send the data transmission in the data bursting mode.

24. The method of claim 22, further comprising sending, to a transmitter node, feedback information regarding at least one of packet error rate (PER), interference levels, burst length, or duty cycles.

25. The method of claim 22, wherein the selected inter-frame spacing comprises one of reduced inter-frame spacing (RIFS) or short inter-frame spacing (SIFS).

26. The method of claim 22, wherein the network comprises a Wi-Fi network.

27. The method of claim 22, wherein the receiver node comprises one of a mobile station (STA) and an access point (AP) within the network.

28. An apparatus, comprising:
means for receiving, over a network, a data transmission in a data aggregation mode, the data transmission comprising aggregated MAC protocol data units (A-MPDUs);
means for detecting potential interference bursts in the network;
means for sending, to a transmitter node, parameters of a selected inter-frame spacing in response to the potential interference bursts in the network, wherein the transmitter node switches from the data aggregation mode to a data bursting mode; and
means for re-receiving the data transmission in the data bursting mode, wherein the data transmission comprises back-to-back data packet bursts separated by the selected inter-frame spacing based at least in part on the parameters previously sent to the transmitter node.

29. The apparatus of claim 28, further comprising means for sending, to a transmitter node, a request for the transmitter node to send the data transmission in the data bursting mode.

30. An apparatus, comprising:
a radio transceiver configured to receive, over a network, a data transmission in a data aggregation mode, the data transmission comprising aggregated MAC protocol data units (A-MPDUs); and
at least one processor configured to:
instruct the radio transceiver to detect potential interference bursts in the network;
instruct the radio transceiver to send, to a transmitter node, parameters of a selected inter-frame spacing in response to the potential interference bursts in the network, wherein the transmitter node switches from the data aggregation mode to a data bursting mode; and
instruct the radio transceiver to re-receive the data transmission in the data bursting mode, in response to potential interference bursts in the network, wherein the data transmission comprising back-to-back data packet bursts is separated by the selected inter-frame spacing based at least in part on the parameters previously sent to the transmitter node.

31. A non-transitory computer-readable medium containing code stored therein, which when executed by a computer, causes the computer to:
receive, over a network, a data transmission in a data aggregation mode, the data transmission comprising aggregated MAC protocol data units (A-MPDUs);
detect potential interference bursts in the network;
send, to a transmitter node, parameters of a selected inter-frame spacing in response to the potential interference bursts in the network, wherein the transmitter node switches from the data aggregation mode to a data bursting mode; and
re-receive the data transmission in the data bursting mode, wherein the data transmission comprising back-to-back data packet bursts is separated by the selected inter-frame spacing based at least in part on the parameters previously sent to the transmitter node.

* * * * *